United States Patent …

(12) United States Patent
Swinyard

(10) Patent No.: US 9,554,524 B2
(45) Date of Patent: Jan. 31, 2017

(54) DELIMB KNIFE WITH INTEGRATED SIDE BLADES

(71) Applicant: Deere & Company, Moline, IL (US)

(72) Inventor: Douglas Craig Swinyard, Rotorua (NZ)

(73) Assignee: WARATAH NZ LIMITED, Tokoroa (NZ)

( * ) Notice: Subject to any disclaimer, the term of this patent is extended or adjusted under 35 U.S.C. 154(b) by 1003 days.

(21) Appl. No.: 13/785,937

(22) Filed: Mar. 5, 2013

(65) Prior Publication Data

US 2013/0327441 A1    Dec. 12, 2013

(30) Foreign Application Priority Data

Jun. 6, 2012  (NZ) ........................................ 600469

(51) Int. Cl.
*A01G 23/095*  (2006.01)
*A01G 23/083*  (2006.01)
*B27L 1/00*    (2006.01)

(52) U.S. Cl.
CPC ........... *A01G 23/095* (2013.01); *A01G 23/083* (2013.01); *B27L 1/00* (2013.01)

(58) Field of Classification Search
CPC ............ B27L 1/10; B27L 1/12; A01G 23/083; A01G 23/095; A01G 23/097
See application file for complete search history.

(56) References Cited

U.S. PATENT DOCUMENTS

| 3,542,099 A | * | 11/1970 | Gibson | A01G 23/091 |
| | | | | 144/338 |
| 4,049,032 A | * | 9/1977 | Oldenburg | A01G 23/083 |
| | | | | 144/24.13 |
| 4,922,976 A | | 5/1990 | Hacker | |
| 5,322,103 A | | 6/1994 | Hudson | |
| 5,406,997 A | | 4/1995 | Davison | |
| 6,070,627 A | | 6/2000 | Hamby, Jr. | |
| 6,263,931 B1 | | 7/2001 | Ericksson | |
| 6,431,232 B1 | | 8/2002 | Seymour | |
| 6,758,248 B2 | | 7/2004 | Nilsson et al. | |
| 8,002,004 B2 | * | 8/2011 | Smythe | A01G 23/095 |
| | | | | 144/24.13 |
| 2006/0157157 A1 | | 7/2006 | Shae | |

FOREIGN PATENT DOCUMENTS

WO    2010081937 A1    7/2010
WO    2010146230 A1    12/2010

OTHER PUBLICATIONS

Examination Report from New Zealand Intellectual Property Office in Counterpart New Zealand Patent Application No. 600469 (2 pages)(Jun. 11, 2012).
Information on Ponsse Harvester Head H 60 BW (3 pages)(Jan. 24, 2012).

* cited by examiner

*Primary Examiner* — Matthew G Katcoff

(57) ABSTRACT

A timber-working head is configured to hold a felled tree and to feed the felled tree. The timber-working head comprises a frame and a delimb knife module mounted to the frame and configured to delimb the felled tree when the felled tree is fed past the delimb knife module. The delimb knife module has a central blade, a pivotable first side blade, and a pivotable second side blade.

20 Claims, 12 Drawing Sheets

DELIMB KNIFE WITH INTEGRATED SIDE BLADES

The present application claims priority to New Zealand Patent Application No. 600469 which was filed on 6 Jun. 2012 and is hereby incorporated by reference herein.

FIELD OF THE DISCLOSURE

The present disclosure relates to timber-working heads with a front delimb knife.

BACKGROUND OF THE DISCLOSURE

There are timber-working heads configured to be suspended from the end of a boom of a base machine. It is common for the heads to have delimb knives to delimb the trees.

SUMMARY OF THE DISCLOSURE

According to an aspect of the present disclosure, a timber-working head has a fore-aft dimension and a lateral dimension perpendicular to the fore-aft dimension. The timber-working head comprises a frame, a grapple-and-feed system mounted to the frame and configured to hold a felled tree and to feed the felled tree in the fore-aft dimension, and a delimb knife module configured to delimb the felled tree when the felled tree is fed past the delimb knife in the fore-aft dimension by the grapple-and-feed system. The delimb knife module comprises a platform detachably mounted to the frame, a central blade, a first side blade, and a second side blade. The central blade is mounted to the platform in fixed relation thereto. The first and second side blades are mounted pivotally to the platform such that the first and second side blades are positioned on laterally opposite sides of the central blade relative to the lateral dimension. The central blade and the first and second side blades cooperate to provide the delimb knife module with a cutting edge that is variable in profile in response to pivotal movement of the first and second side blades relative to the platform.

According to another aspect of the present disclosure, a timber-working head has a fore-aft dimension and a lateral dimension perpendicular to the fore-aft dimension. The timber-working head comprises a frame, a grapple-and-feed system mounted to the frame and configured to hold a felled tree and to feed the felled tree in the fore-aft dimension, and a delimb knife configured to delimb the felled tree when the felled tree is fed past the delimb knife in the fore-aft dimension by the grapple-and-feed system. The delimb knife is mounted to the frame and comprises a central blade, a first side blade, and a second side blade. The first and second side blades are positioned on laterally opposite sides of the central blade relative to the lateral dimension and mounted pivotally relative to the central blade such that the central blade and the first and second side blades cooperate to provide the delimb knife with a cutting edge that is variable in profile in response to pivotal movement of the first and second side blades relative to the central blade. The delimb knife comprises a pivotally mounted first carrier to which the first side blade is mounted, a pivotally mounted second carrier to which the second side blade is mounted, a compression first spring biasing yieldably the first carrier and the first side blade therewith, a compression second spring biasing yieldably the second carrier and the second side blade therewith, and a debris shield covering the first and second springs and positioned in overlapping relation with each of the first and second carriers in front of the first and second springs relative to the fore-aft dimension.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
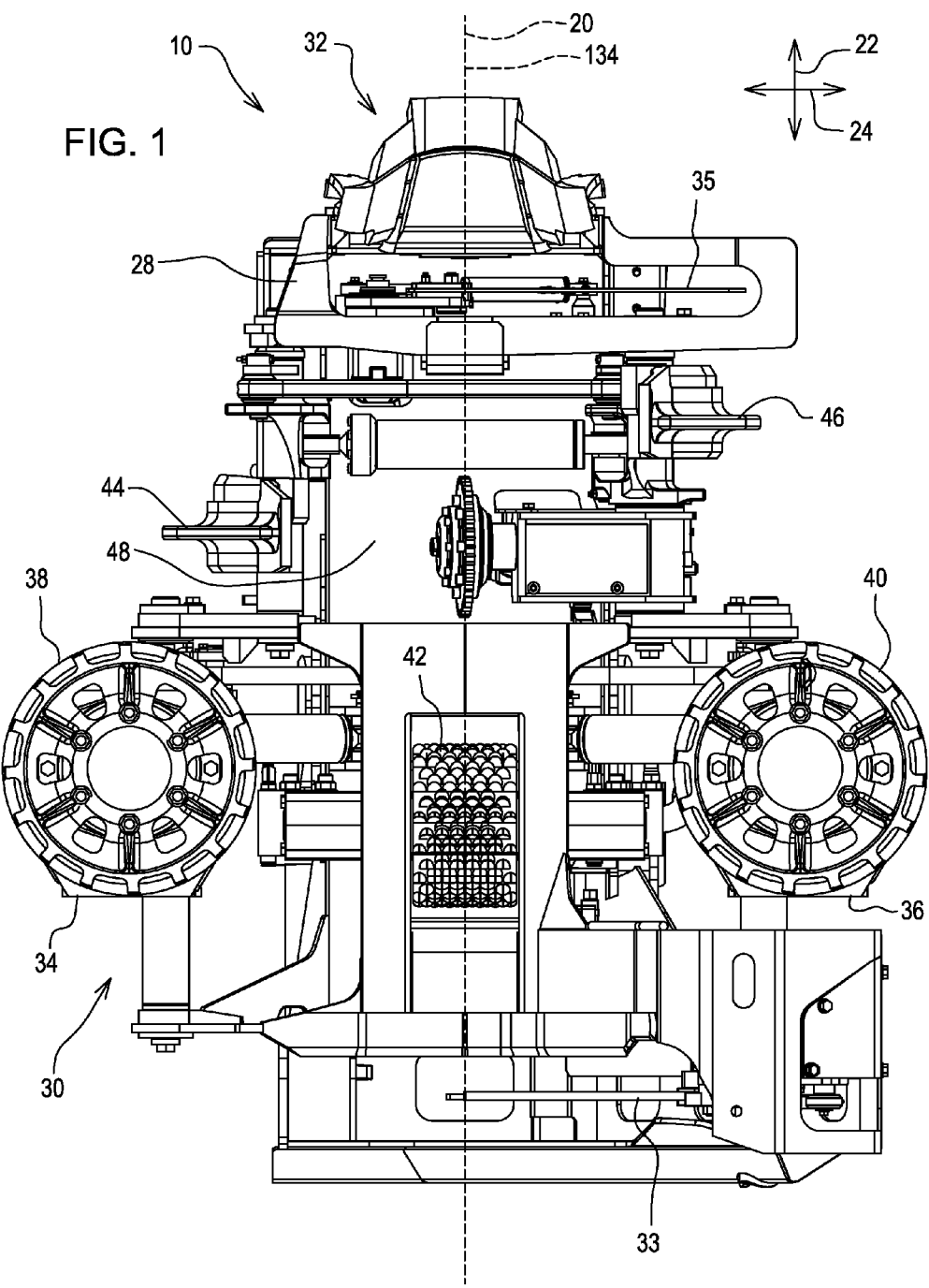
FIG. 1 is an elevation view showing a timber-working head having a delimb knife in the form of, for example, a delimb knife module.
Figure 2:
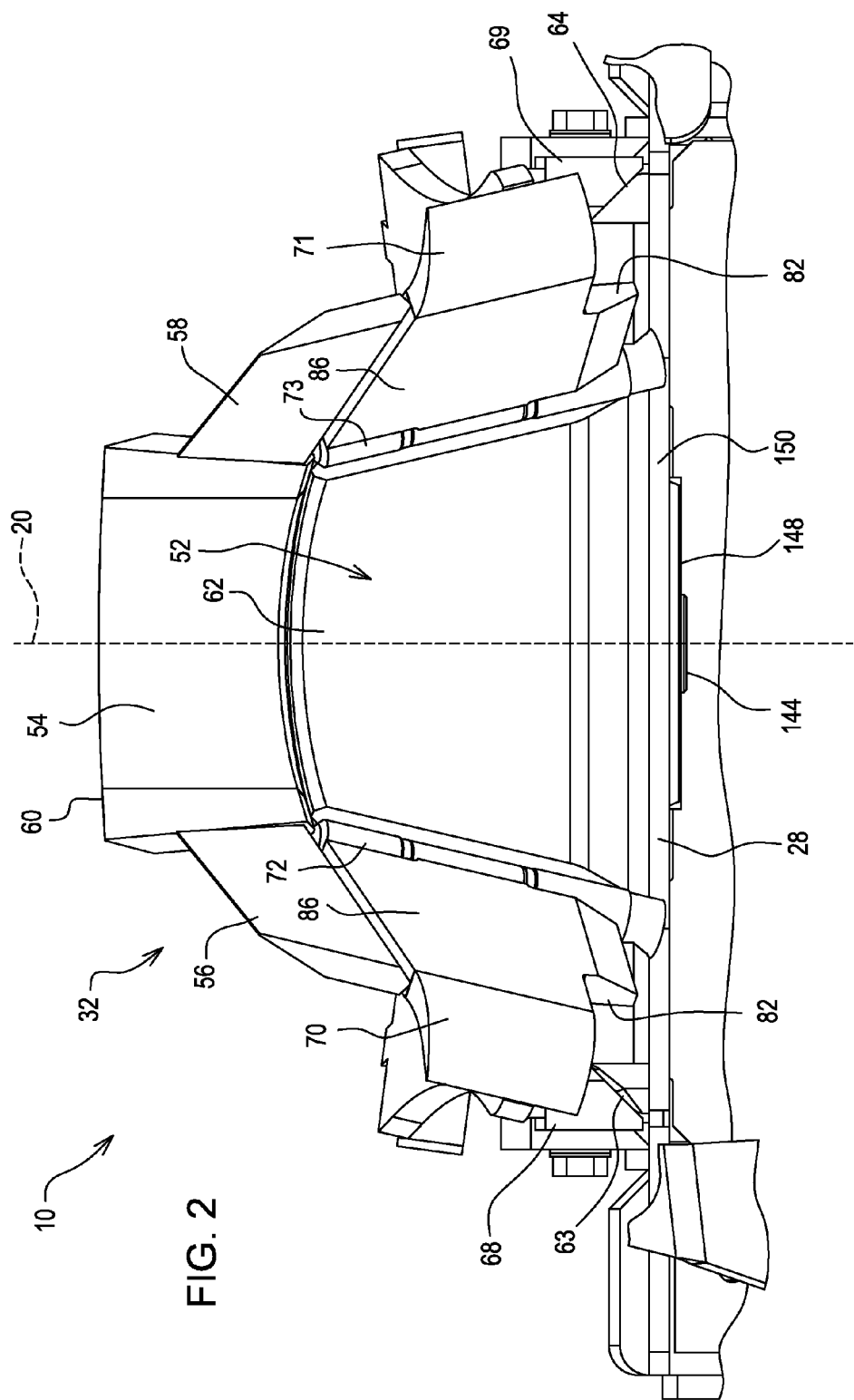
FIG. 2 is an enlarged elevation view showing the delimb knife module, the delimb knife module having a central blade and pivotable first and second side blades.
Figure 3:
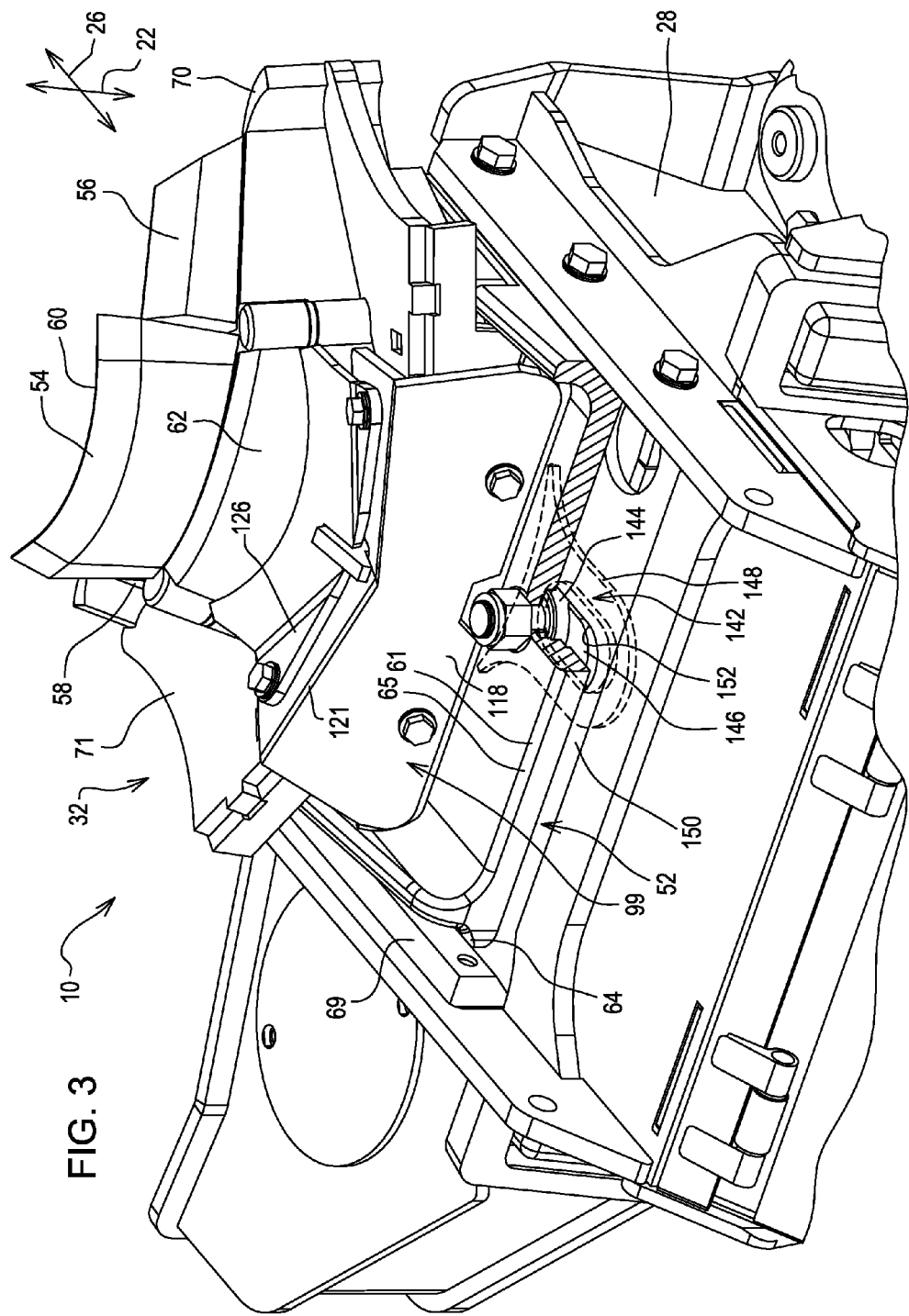
FIG. 3 is a perspective view, with portions broken away, showing mounting of the delimb knife module to a frame of the timber-working head.

Referring to FIGS. 1-3, there is shown a timber-working head 10. The head 10 is illustrated, for example, as a harvester-and-processor head capable of grappling, felling, delimbing, and cutting a tree into one or more logs of predetermined length. It may also be configured to debark the tree or logs thereof.

The head 10 is attachable to the boom (articulated or non-articulated) or other support structure of a carrier, using, for example, a hanger so as to be suspended therefrom, for manipulation by an operator located in an operator's station of a base vehicle of the carrier. The hanger may have a hanging bracket to which the head 10 is mounted for pivotal movement between a generally upright, harvesting position for felling a tree and a generally prone, processing position for processing the felled tree (e.g., delimbing, debarking, cutting to length) or other timber, a hydraulic rotator attached to the hanging bracket for rotating the head 10 and the handing bracket, and a joint interconnecting the rotator and the boom. The head 10 is designed to pivot under its own weight, or its own weight plus that of a felled tree if it has just felled a tree, from the harvesting position to the processing position. A hydraulic cylinder (not shown)

extending between and attached to the head 10 and the hanging bracket is configured to pivot the head 10 back to the harvesting position.

The head 10 has a median plane 20, a first or fore-aft dimension 22, a second or lateral dimension 24, and a third or depth dimension 26. The fore-aft dimension 22, the lateral dimension 24, and the depth dimension 26 are perpendicular to one another. The fore-aft dimension 22 and the depth dimension 26 are parallel to the median plane. The lateral dimension 24 is perpendicular to the median plane 20.

The head 10 has a frame 28 (configured, for example, as a weldment), a grapple-and-feed system 30, and a delimb knife in the form of, for example, a delimb knife module 32. The frame 28 is configured, for example, as a weldment.

The head 10 has one or more chain saws mounted to the frame 28. With respect to each chain saw, a hydraulic motor of the head 10 is mounted to the frame 28 to drive the chain of the saw about a bar of the saw, and a hydraulic cylinder of the head 10 is attached to the frame 28 and the saw to pivot the saw relative to the frame 28 during a cutting event. The head 10 may have such a saw in the form of a felling saw 33 (saw bar shown, and chain not shown but understood to be present) mounted pivotally to the frame 28 near an aft or butt end of the head 10 and operable to fell and cross-cut a tree and, in some examples, such a saw in the form of a topping saw 35 (saw bar shown, and chain not shown but understood to be present) mounted pivotally to the frame 28 near a fore end of the head 10 and operable to cross-cut the felled tree so as to cut off the top of the tree for value recovery.

The grapple-and-feed system 30 is mounted to the frame 28 and configured to hold a felled tree and to feed the felled tree in the fore-aft dimension 22. The system 30 exemplarily has a first or right-hand (RH) feed arm 34 attached pivotally to the frame 28 on a first or RH side of the plane 20, a second or left-hand (LH) feed arm 36 attached pivotally to the frame 28 on a second or LH side of the plane 20, an arm-mounted first or RH feed wheel 38 included in the first feed arm 34 at a free end thereof, an arm-mounted second or LH feed wheel 40 included in the second feed arm 36 at a free end thereof, and a frame-mounted feed wheel 42 mounted to the frame 28 such that its axis of rotation is positioned in fixed relation to the frame 28. The system 30 exemplarily includes a hydraulic motor of the system 30 mounted to the first feed arm 34 so as to be carried thereby and drivingly attached to the first feed wheel 38 to rotate the wheel 38 about its axis of rotation in forward and reverse directions, a hydraulic motor mounted to the second feed arm 36 so as to be carried thereby and drivingly attached to the second feed wheel 40 to rotate the wheel 40 about its axis of rotation in forward and reverse directions, and two hydraulic motors mounted to the frame 28 on opposite sides of the frame-mounted feed wheel 42 and drivingly attached to the feed wheel 46 to rotate the wheel 46 about its axis of rotation in forward and reverse directions.

The system 30 exemplarily has a hydraulic cylinder attached to the frame 28 and the first feed arm 34 to open and close the feed arm 34 relative to the frame 28 and a hydraulic cylinder attached to the frame 28 and the second feed arm 36 to open and close the feed arm 36 relative to the frame 28. As such, the feed arms 34, 36 are configured to embrace and release the felled tree.

The system 30 exemplarily has a first or RH delimb arm 44 attached pivotally to the frame 28 on a first or RH side of the plane 20, a second or LH delimb arm 46 attached pivotally to the frame 28 on a second or LH side of the plane 20, and a hydraulic cylinder attached to the first and second delimb arms 44, 46 to open and close the first and second delimb arms 44, 46 relative to the frame 28. The hydraulic cylinder may do so with the assistance of a timing link attached to the arms 44, 46 to coordinate their opening and closing together when the system 30 has such a timing link or without the assistance of a timing link when the system 30 lacks such a timing link (e.g., when the head 10 is to be used with tree trunks characterized by sweep or other imperfections such that use of the timing link is less suitable). Each delimb arm 44, 46 has a blade for delimbing the timber. The arms 44, 46 are configured to embrace and delimb the felled tree when the felled tree is fed in the fore-aft dimension 22 by the system 30. The system 30 may have more or less delimb arms than the arms 44, 46 (e.g., one or more additional delimb arms between the feed arms 34, 36 and the saw 33 relative to the fore-aft dimension 22 of the head 10).

The system 30 exemplarily has a number of other components including, for example, a valve block (not shown) mounted to a torso or body back 48 of the frame 28 and covered by a valve cover, and various electrical lines and hoses.

During a felling operation, the operator maneuvers the head 10 into proximity to a standing tree and causes the feed arms 34, 36 and the delimb arms 44, 46 to embrace the tree. The felling saw 33, is actuated so as to cut through and fell the tree. While holding the felled tree, the head 10 pivots from its harvesting position to its processing position for processing the felled tree. Skilled operators sometimes begin processing as the felled tree is falling.

During processing, the felled tree may then be fed in the fore-aft dimension 22. To do so, the feed wheels 38, 40, 42 are driven hydraulically in corresponding directions. During such feeding, the delimb knife module 32 and the delimb arms 44, 46 delimb the tree, and the tree may also be debarked by use of well-known debarking techniques, illustratively by use of debarking-type wheels for the feed wheels 38, 40, 42 and/or opposite angling of the wheels 38, 40 relative to the frame 28 to add rotation to the tree ("and/or" means and or or).

Once the tree has been sufficiently delimbed and debarked, as applicable, the operator may wish to cut the tree into logs of predetermined length. A photosensor (e.g., photocell), located at the aft end of the head 10 a short distance offset from the saw 33 in the fore-aft dimension, is configured to sense the butt end of the tree to define the initial datum point from which to start measuring the predetermined length of the first log (accounting for the offset between the photosensor and the saw 33 in the control software).

A toothed length-measurement wheel of the head 10 is mounted to the torso 48 of the frame 28 such that its axis of rotation is positioned in fixed relation to the frame 28. The wheel contacts the surface of the felled tree and rotates against the felled tree upon feeding of the felled tree in the fore-aft dimension 22. Rotation of the wheel is sensed and used to determine length of the timber in a well-known manner. When the tree has been fed the predetermined length, the saw 33 is activated to cut the first log from the tree. Depending on the available length of the tree, subsequent logs may be cut from the tree in the same or similar manner.

In other operations, the head 10 may be used to process an already-felled tree or logs thereof. The head 10 may also be used to process simultaneously multiple trees or logs of sufficiently small diameter, although processing only one at a time would be more typical.

Referring to FIGS. 2 and 3, the delimb knife module 32 is configured to delimb a felled tree when the felled tree is fed past the delimb knife module 32 in the fore-aft dimension 22 by the grapple-and-feed system 30. The modularity of the delimb knife module 32 allows the module 32 to be readily attached to any of a number of timber-working heads, whether initially or by removal from one head and attachment to another head.

The delimb knife module 32 has a platform 52 detachably mounted to the frame 28, a central blade 54, a first or RH side blade 56, and a second or LH side blade 58. The central blade 54 is mounted (e.g., welded) to the platform 52 in fixed relation thereto. The first and second side blades 56, 58 are mounted pivotally (e.g., hinged) to the platform 52 such that the first and second side blades 56, 58 are positioned on laterally opposite sides of the central blade 54 relative to the lateral dimension 24. The central blade 54 and the first and second side blades 56, 58 cooperate to provide the delimb knife module 32 with a cutting edge 60 that is variable in profile in response to pivotal movement of the first and second side blades 56, 58 relative to the platform 52. Integration of the side blades 56, 58 into the module 32 promotes their ease of use with any of a number of timber-working heads, whether initially or by removal from one head and attachment to another head.

The first and second side blades 56, 58 are positioned so as to provide delimbing coverage at about the ten o'clock and two o'clock positions of the periphery of the felled tree, which, without the side blades 56, 58, may otherwise lack delimb coverage between the central blade 54 and the delimb arms 44, 46. Such delimb coverage at the ten o'clock and two o'clock positions is particularly useful with tree diameters between 150 millimeters and 300 millimeters, but may also be useful with any other tree diameters.

The central blade 54 is tapered laterally outwardly relative to the lateral dimension 24 as it extends forwardly in the fore-aft dimension 22 so as to overlap slightly the laterally inward edges of the side blades 56, 58 to inhibit ingress of debris between the central blade 54 and the side blades 56, 58. The taper is, for example, nominally four degrees when the central blade 54 is flat before it is rolled for attachment (e.g., welding) to the platform 52.

The delimb knife module 32 is detachably mounted to the frame 28 at a fore end of the frame 28, exemplarily to a housing for the topping saw 35 and included in the frame 28. The platform 52 has a mounting wall 61 mounted to the frame 28 and a support wall 62 mounted to the mounting wall 61 so as to angle forwardly from the mounting wall 61 relative to the fore-aft dimension 22. The platform 52 is, for example, a one-piece construction (e.g., a casting) in which case the walls 61, 62 are included in that one-piece construction so as to be integral with one another.

The mounting wall 61 has a first or RH side rail 63 and a second or LH side rail 64, the side rails 63, 64 beveled and positioned on laterally opposite sides of a panel 65 of the mounting wall 61 relative to the lateral dimension 24. The first side rail 63 is positioned laterally outward of a first or RH flange 66 protruding from the panel 65 in the fore-aft dimension 22, and the second side rail 64 is positioned laterally outward of a second or LH flange 67 protruding from the panel 65 in the fore-aft dimension 22. A first or RH dovetail 68 fastened to the frame 28 with a number of fasteners (e.g., three fasteners each with a bolt, washer, and nut) and a second or LH dovetail 69 fastened to the frame 28 with a number of fasteners (e.g., three fasteners each with a bolt, washer, and nut) mate respectively against the first rail 63 and the second rail 64 such that the platform 52 is constrained relative to the fore-aft dimension 22. The support wall 62 is mounted to the panel 65 along an edge thereof so as to angle forwardly from the panel 65 relative to the fore-aft dimension 22.

Movement of the delimb knife module 32 in the depth dimension 26 is limited by use of a travel limiter 142. The travel limiter 142 has a fastener 144, in the form of a bolt and a nut, fastened to the panel 65 of the mounting wall 61 and a keeper 146, in the form of a rounded plate convex on one side and concave on the other side. The keeper 146 is attached (e.g., welded) to the head of the bolt of the fastener 144. The head of the bolt and the keeper 146 are positioned in a slot 152 provided by a plate 150 of the topping saw housing and a reinforcement plate 148 attached (e.g., welded) a side of the housing plate 152 opposite to the module 32. The keeper 146 and the head of the bolt of the fastener 144 are exemplarily sized such that they substantially fill the slot 152, thereby substantially blocking movement of the module 32 in the depth dimension 26.

The keeper 146 may be reduced in size to allow some movement of the module 32 in the depth dimension 26, but not so much as to allow a clash between the hinges 72, 73 and the housing plate 150. In such a case, the module 32 may be allowed to "float" a limited amount in response to changes in the shape of the tree with gravity urging the module 32 toward the tree. Such a float feature may be useful with soft wood.

The delimb knife module 32 has a first or RH carrier 70 mounted pivotally (e.g., hinged) to the platform 52 and to which the first side blade 56 is mounted (e.g., welded) and a second or LH carrier 71 mounted pivotally (e.g., hinged) to the platform 52 and to which the second side blade 58 is mounted (e.g., welded). The first and second carriers 70, 71 are positioned on laterally opposite sides of the platform 52 relative to the lateral dimension 24.

Exemplarily, the first and second carriers 70, 71 are hinged to the platform 52, such as, for example, to the support wall 62 thereof. A first or RH hinge 72 mounts the first carrier 70 to the support wall 62 on a first lateral or RH side of the support wall 62, and a second or LH hinge 73 mounts the second carrier 71 to the support wall 62 on a second lateral or LH side of the support wall 62. Each hinge 72, 73 has a number of hinge barrels, a number of washers positioned between adjacent hinge barrels, and a pin positioned in the hinge barrels and extending through the washers. Exemplarily, each hinge 72, 73 has two hinge barrels—a fore hinge barrel and an aft hinge barrel—mounted (e.g., welded) to the support wall 62 (one of those two hinge barrels may also be welded to the panel 65 in a notch thereof) and one hinge barrel mounted (e.g., welded) to the respective carrier 70, 71, and two washers positioned respectively on either side of the hinge barrel mounted to the respective carrier 70, 71. With respect to each hinge 72, 73, the shank of the pin of that hinge 72, 73 is threaded to the fore hinge barrel of that hinge 72, 73 causing the head of that pin to press against the aft hinge barrel of that hinge 72, 73. Each washer of the hinges 72, 73 is, for example, a D-glide bearing made of a composite material such as a fiber-reinforced resin.

The first and second carriers 70, 71 are mounted to pivot relative to the platform 52 independently of one another and independently of each delimb arm 44, 46 (and any other delimb arm of the head 10), and, as such, the first and second side blades 56, 58 are mounted to pivot relative to the platform 52 independently of one another and independently of each delimb arm 44, 46 (and any other delimb arm of the head 10).

Figure 8:
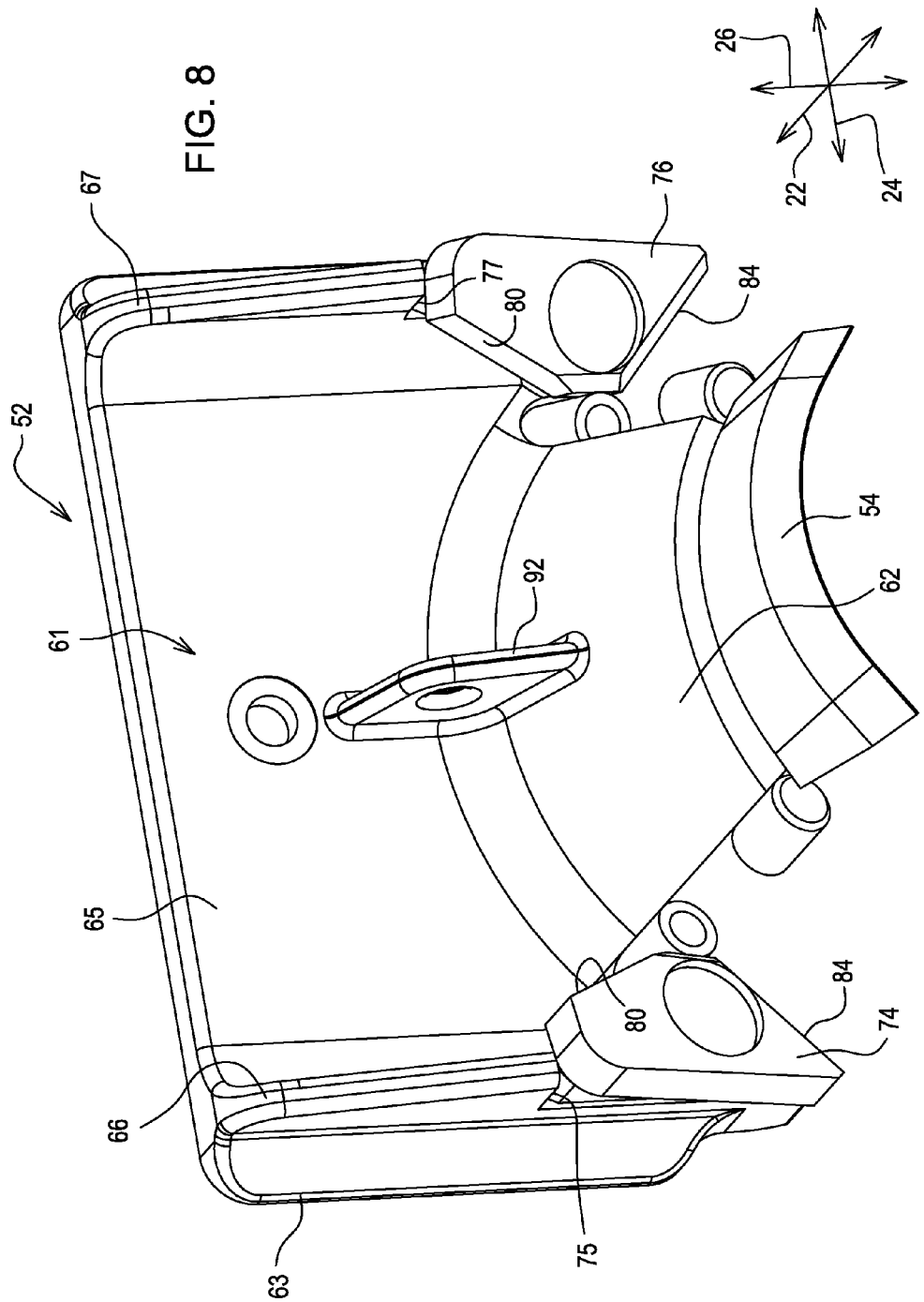
FIG. 8 is a perspective view showing a platform of the delimb knife module and two stop bodies of the module mounted to the platform.

Referring to FIG. 8, the delimb knife module 32 has a first stop body 74 and a second stop body 76. The first and second stop bodies 74, 76 are mounted (e.g., welded) to the platform 52. Exemplarily, the first stop body 74 is positioned in a first or RH notch 75 (e.g., L-shaped notch) of the mounting wall 61 and mounted (e.g., welded) to that notch 75, and the second stop body 76 is positioned in a second or LH notch 77 (e.g., L-shaped notch) of the second side rail 64 and mounted (e.g., welded) to that notch 77. The first notch 75 is included in the first flange 66, and the second notch 77 is included in the second flange 67.

Referring to FIGS. 4-7, the first carrier 70 and the first side blade 56 are pivotable relative to the platform 52 between a first extreme position (FIGS. 4 and 5) in which a first striker 78 of the first carrier 70 contacts a first abutment 80 of the first stop body 74 and a second extreme position (FIGS. 6 and 7) in which a second striker 82 of the first carrier 70 contacts a second abutment 84 of the first stop body 74, those first and second extreme positions defining the opposite extremes of the pivot range of the first carrier 70 and the first side blade 56. Similarly, the second carrier 71 and the second side blade 58 are pivotable relative to the platform 52 between a first extreme position (FIGS. 4 and 5) in which a first striker 78 of the second carrier 71 contacts a first abutment 80 of the second stop body 76 and a second extreme position (FIGS. 6 and 7) in which a second striker 82 of the second carrier 71 contacts a second abutment 84 of the second stop body 76, those first and second extreme positions defining the opposite extremes of the pivot range of the second carrier 71 and the second side blade 58. Each stop body 74, 76 incorporates both of the first and second abutments 80, 84, promoting compactness of the module 32.

The stop bodies 74, 76 limit movement of the carriers 70, 71 and the side blades 56, 58 beyond the first extreme position to facilitate pick-up or otherwise reception of a tree. The carriers 70, 71 and the side blades 58, 58 are biased to the first extreme position. The stop bodies 74, 76 limit movement of the carriers 70, 71 and the side blades 56, 58 beyond the second extreme position in order to provide resistance against a large-diameter tree to promote delimbing.

Each of the first and second carriers 70, 71 has a first plate 86, a second plate 87 attached (e.g., welded) on edge to the first plate 86, and a third plate 88 attached (e.g., welded) on edge to the second plate 87. The first blade 56 is mounted (e.g., welded) to the first plate 86 of the first carrier 70. The first plate 86 of the first carrier 70 has the first striker 78 of the first carrier 70. The third plate 88 of the first carrier 70 has the second striker 82 of the first carrier 70. The second blade 58 is mounted (e.g., welded) to the first plate 86 of the second carrier 71. The first plate 86 of the second carrier 71 has the first striker 78 of the second carrier 71. The third plate 88 of the second carrier 71 has the second striker 82 of the second carrier 71.

Figure 13:
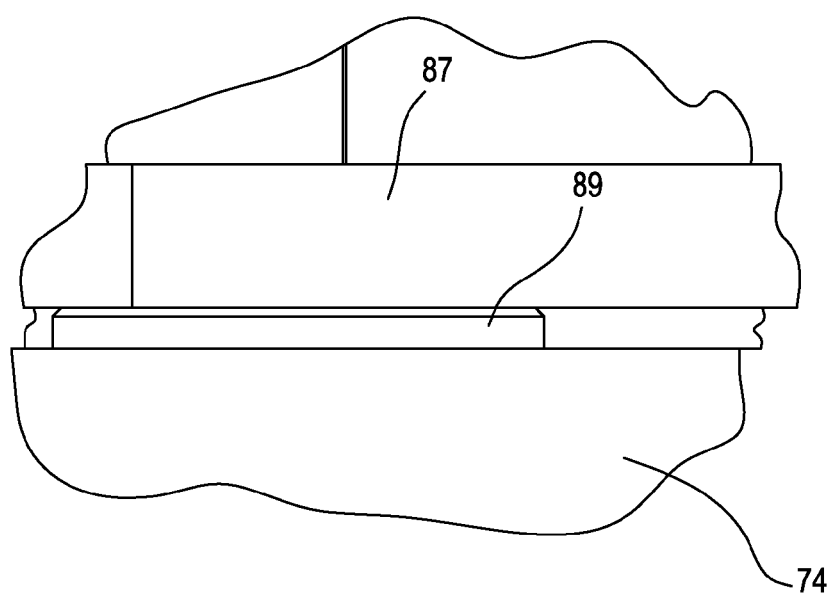
FIG. 13 is a side elevation view showing a thrust bearing between components.

The delimb knife module 32 has a first or RH thrust bearing 89 and a second or LH thrust bearing 90 to promote the longevity of the hinges 72, 73. The first thrust bearing 89 is positioned between the first carrier 70 and the first stop body 74 in contact with the first carrier 70 (e.g., the second plate 87 thereof) and the first stop body 74, as shown, for example, in FIG. 13. The first thrust bearing 89 is mounted within a depression of the first stop body 74. The second thrust bearing 90 is positioned between the second stop body 76 and the second carrier 71 in contact with the second carrier 71 (e.g., the second plate 87 thereof) and the second stop body 76. The second thrust bearing 90 is mounted within a depression of the second stop body 76. In practice, the thrust bearings 89, 90 will bottom out in the respective depressions, but, for the sake of illustration, the thrust bearings 89, 90 are shown extending farther outside their depressions than in actual practice so as to take up the thickness of a powder coating, not shown in the drawings, in order to show contact between the thrust bearings 89, 90 and the carriers 70, 71.

The thrust bearings 89, 90 are configured, for example, as load bearing thrust washers, each having a central, internally threaded hole to receive a tool for removing the bearing 89, 90 from the respective stop body 74, 76. Each bearing 89, 90 is, for example, a D-glide bearing made, for example, of a composite material such as a fiber-reinforced resin.

Each of the first and second carriers 70, 71 has a gusset 91. The gusset 91 of the first carrier 70 is mounted (e.g., welded) to and reinforces the connection between the second and third plates 87, 88 of the first carrier 70. Similarly, the gusset 91 of the second carrier 71 is mounted (e.g., welded) to and reinforces the connection between the second and third plates 87, 88 of the second carrier 71. Each gusset 91 is L-shaped and has a notch that receives a key of the second plate 87 of the respective carrier 70, 71 for alignment during fabrication.

Referring to FIGS. 5 and 7-9, the platform 52 has a tab 92. The tab 92 is positioned at the junction between the mounting wall 61 and the support wall 62 so as to be attached to both walls 61, 62 forming a web therebetween. The delimb knife module 32 has a first or RH spring 94 (e.g., compression spring such as a compression coil spring) positioned between the tab 92 and the third plate 88 of the first carrier 70 and a second or LH spring 95 (e.g., compression spring such as a compression coil spring) positioned between the tab 92 and the third plate 88 of the second carrier 71.

The delimb knife module 32 has a first or central peg 96, a second or RH peg 97, and a third or LH peg 98. The first peg 96 is positioned within a hole of the tab 92 and is mounted (e.g., welded) to the tab 92 such that a first portion of the peg 96 and a second portion of the peg 96 are positioned on laterally opposite sides of the tab 92 relative to the lateral dimension 24. The second peg 97 is positioned within a hole of the third plate 88 of the first carrier 70 and is mounted (e.g., welded) to that plate 88 such that the peg 97 extends laterally inwardly from that plate 88 relative to the lateral dimension 24. The third peg 98 is positioned within a hole of the third plate 88 of the second carrier 71 and is mounted (e.g., welded) to that plate 88 such that the peg 98 extends laterally inwardly from that plate 88 relative to the lateral dimension 24. The first spring 94 is mounted to the first portion of the peg 96 and to the second peg 97, and the second spring 95 is mounted to the second portion of the peg 96 and to the third peg 98. For example, opposite ends of the spring 94 are positioned respectively to a radial hole of the first portion of the first peg 96 and to a radial hole of the second peg 97, and opposite ends of the spring 95 are positioned respectively to a radial hole of the second portion of the first peg 96 and to a radial hole of the third peg 98.

The delimb knife module 32 has a four dowels (not shown) for retaining the end portions of the springs 94, 95 on the pegs 96, 97, 98. Near each of the ends of the springs 94, 95 is a dowel extending diametrically through a diametrically-extending through-hole of the respective peg 96, 97, 98. The first peg 96 has two such through-holes, and two dowels extend respectively through those through-holes, retaining respective end portions of the springs 94, 95 on the first peg 96. The second peg 97 has such a through-hole, and a third dowel extends through that through-hole, retaining a respective end portion of the spring 94 on the second peg 97.

The third peg 98 has a such a through-hole, and a fourth dowel extends through that through-hole, retaining a respective end portion of the spring 95 on the third peg 98. Each dowel may be configured as a split roll pin having a longitudinally extending, open seam such that the dowel is compressible to establish an interference fit in the respective through-hole.

Referring to FIGS. 4, 6, and 9-11, the delimb knife module 32 has a debris shield 99 mounted to the platform 52 aft of the central blade 54 relative to the fore-aft dimension 22. The debris shield 99 covers the first spring 94 and the second spring 95 and has a first or RH end opening 100 and a second or LH end opening 102. The first and second end openings 100, 102 are positioned laterally opposite to one another relative to the lateral dimension 24. The first and second carriers 70, 71 telescope respectively through the first and second end openings 100, 102 throughout their pivot ranges such that the debris shield 99 and the first and second carriers 70, 71 cooperate to shield the first spring 94, the second spring 95, a first or RH gap 104 defined between the third plate 88 of the first carrier 70 and the first stop body 74 when the first carrier 70 is positioned apart from the second extreme position of the first carrier 70, and a second or LH gap 106 defined between the third plate 88 of the second carrier 71 and the second stop body 76 when the second carrier 71 is positioned apart from the second extreme position of the second carrier 71 against debris flowing in an aft direction 108 relative to the fore-aft dimension 22.

Figure 9:
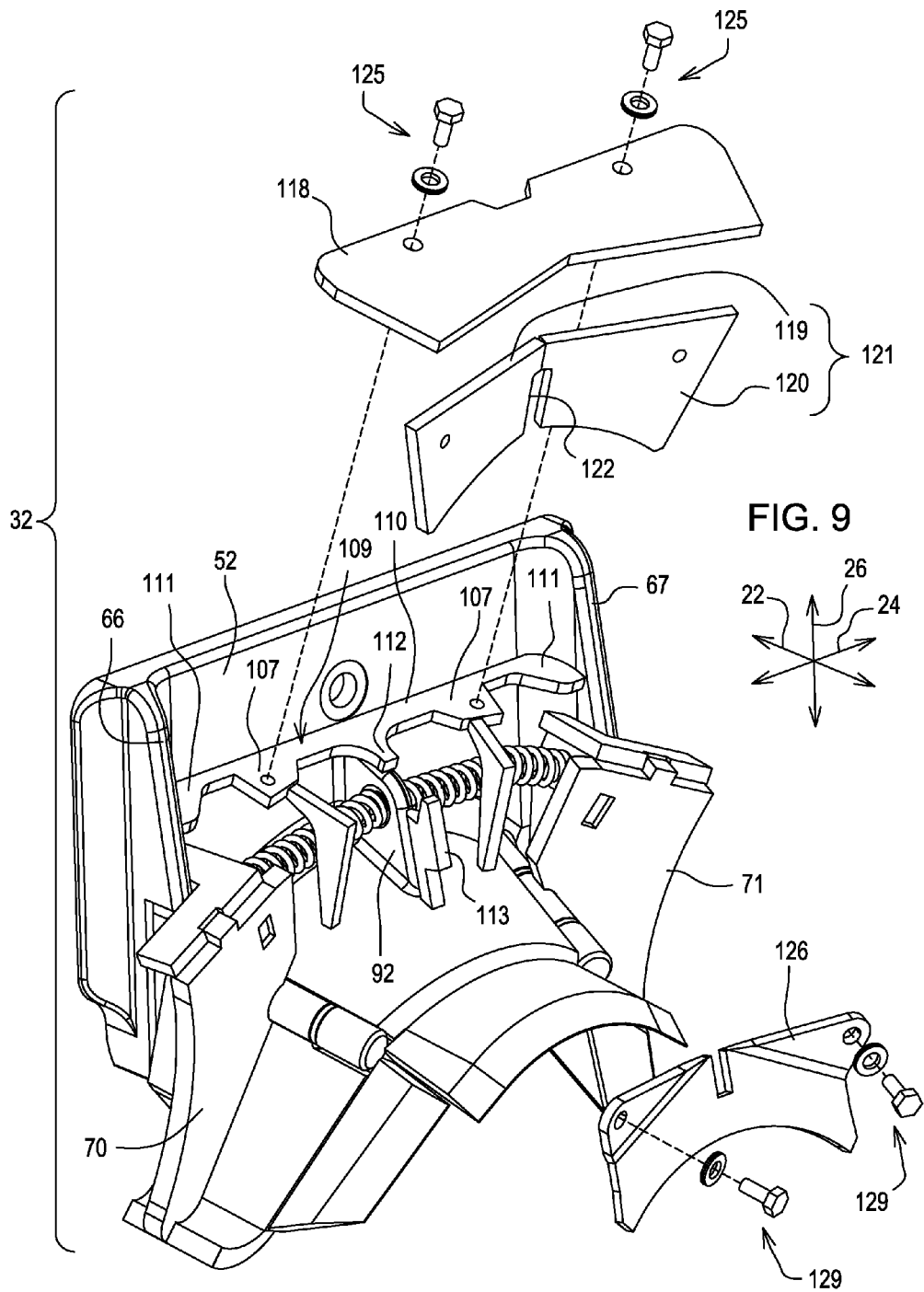
FIG. 9 is a partially exploded view of the delimb knife module.

Referring to FIG. 9, the debris shield 99 has a mounting bracket 109 mounted (e.g., welded) to the platform 52. The mounting bracket 109 has a spine 110 extending laterally relative to the lateral dimension 26 and mounted (e.g., welded) to the panel 65, two shoulders 111 positioned at laterally opposite ends of the spine 110 and the mounting bracket 109 relative to the lateral dimension 26 and mounted (e.g., welded) to the panel 65 and respectively to the flanges 66, 67 so as to next between the panel and the flanges 66, 67, a nose 112 mounted (e.g., welded) to the tab 92, and two lugs 107 positioned respectively between the nose 112 and the two shoulders 111 and extending forwardly relative to the fore-aft dimension 22.

Figure 10:
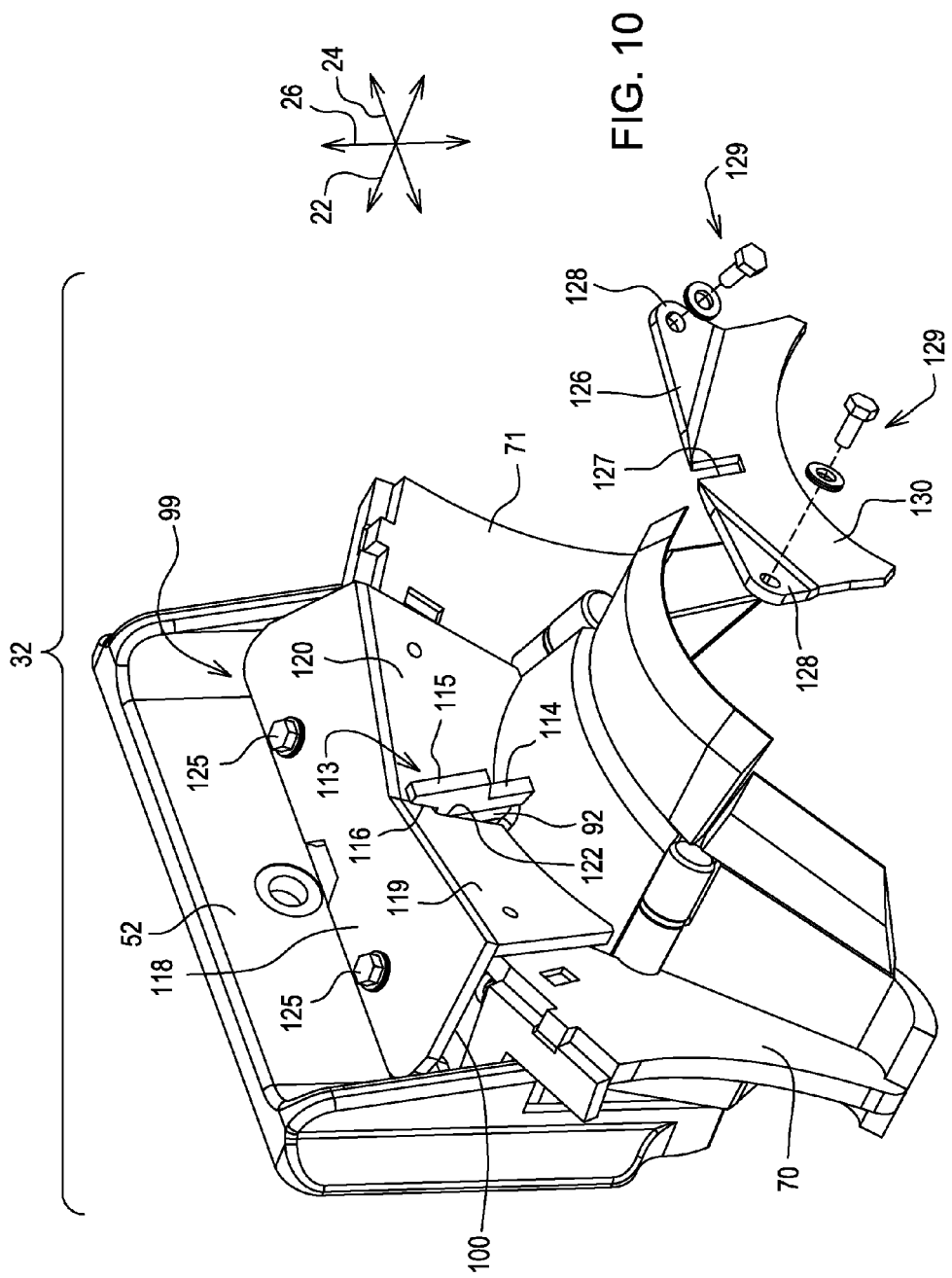
FIG. 10 is a partially exploded view of the delimb knife module.
Figure 11:
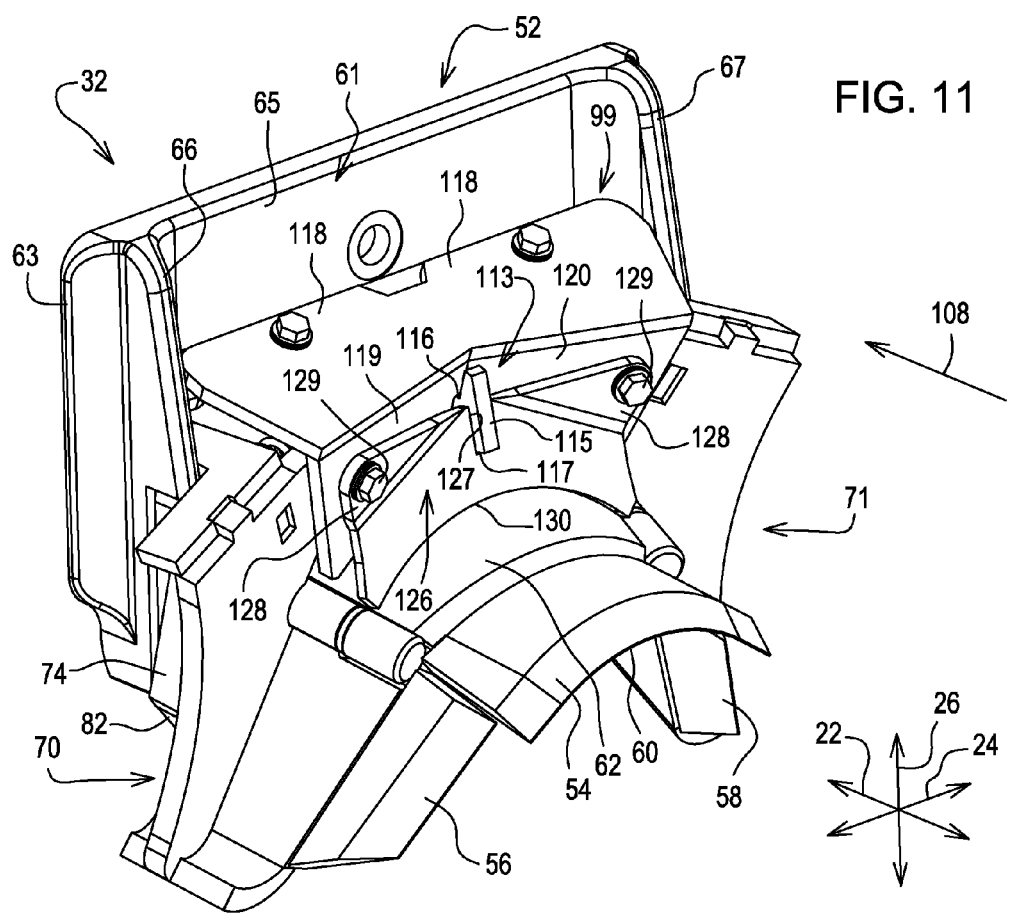
FIG. 11 is a perspective view of the delimb knife module.
Figure 12:
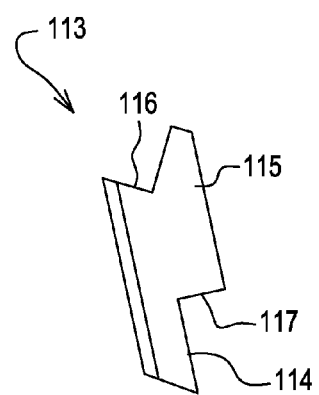
FIG. 12 is a side elevation view of an alignment key of the delimb knife module.

Referring to FIGS. 10-12, the debris shield 99 has an alignment key 113. The key 113 is mounted (e.g., welded) to the platform 52, such as to the tab 92 and the support wall 62.

Exemplarily, the key 113 has a first leg 114 and a second leg 115. The legs 114, 115 partially overlap one another in the fore-aft dimension 22 but extend beyond one another in the third dimension 28 such that the first and second legs 114, 115 cooperate to provide a first recessed portion 116 therebetween and a second recessed portion 117 therebetween, giving the key 113 a Z-shape. The first leg 114 is mounted (e.g., welded) to the tab 92 along an aft edge of the first leg 114 and to the support wall 62. Exemplarily, the first leg 114 is beveled along the aft edge on both lateral sides of the leg 114 forming a weld groove located between the leg 114 and the tab 92 and receiving the weld material.

Referring to FIGS. 9-11, the debris shield 99 has a cover wall 118 and a front wall 121. The cover wall 118 is configured, for example, as a plate. The front wall 121 has a first or RH front plate 119 and a second LH front plate 120. The first and second front plates 119, 120 are attached (e.g., welded) to the cover wall 118 respectively along a first front edge of the cover wall 118 and a second front edge of the cover wall 118. Each of the first and second front plates 119, 120 has a nose projecting laterally inwardly relative to the lateral dimension 26. The noses of the front plates 119, 120 are attached (e.g., welded) to one another such that the first and second plates 119, 120 cooperate to provide the debris shield 99 with the front wall 121. The cover wall 118, the first front plate 119, and the second front plate 120 are attached to one another (e.g., welded together).

The front wall 121 has a slot 122. The slot 122 is defined between the laterally inward edges of the front plates 119, 120 and opens at a peripheral edge of the front wall 121 adjacent to the support wall 62.

The debris shield 99 has a first or RH gusset 123 and a second or LH gusset 124. The first gusset 123 is mounted (e.g., welded) to the cover wall 118 and the first front plate 119 so as to reinforce the connection therebetween, and the second gusset 124 is mounted (e.g., welded) to the cover wall 118 and the second front plate 120 so as to reinforce the connection therebetween.

The cover wall 118, the first and second front plates 119, 120, and the first and second gussets 123, 124 cooperate to provide a sub-assembly (e.g., a weldment). The sub-assembly is mounted to the platform 52 after mounting the mounting bracket 109 to the mounting wall 61 and the alignment key 113 to the support wall 62 and the tab 92. To mount the sub-assembly to the platform 52, the front wall 121 is positioned over the key 113 and the tab 92, and the cover wall 118 is detachably mounted to the mounting bracket 109. The slot 122 of the front wall 121 is positioned over the first leg 114 of the key 113 and the tab 92, such that first leg 114 and the tab are positioned in the slot 122 and the first recessed portion 116 of the key 113 receives the laterally inwardly projecting noses of the front plates 119, 120. The key 113 is thus positioned in the slot 122 of the front wall 121.

The cover wall 118 is detachably mounted to the mounting bracket 109. The cover wall 118 is attached to each lug 107 with a respective fastener 125. Each fastener 125 includes a bolt and a washer, the bolt extending through the washer into a threaded hole of the respective lug 107. A notch is formed in a rear edge of the cover wall 118 to provide clearance for the head of the bolt of the fastener 144 during mounting of the sub-assembly. Once the sub-assembly is so mounted, the cover wall 118 and the front wall 121 cooperate to protect the first and second springs 94, 95 from debris.

Figure 4:
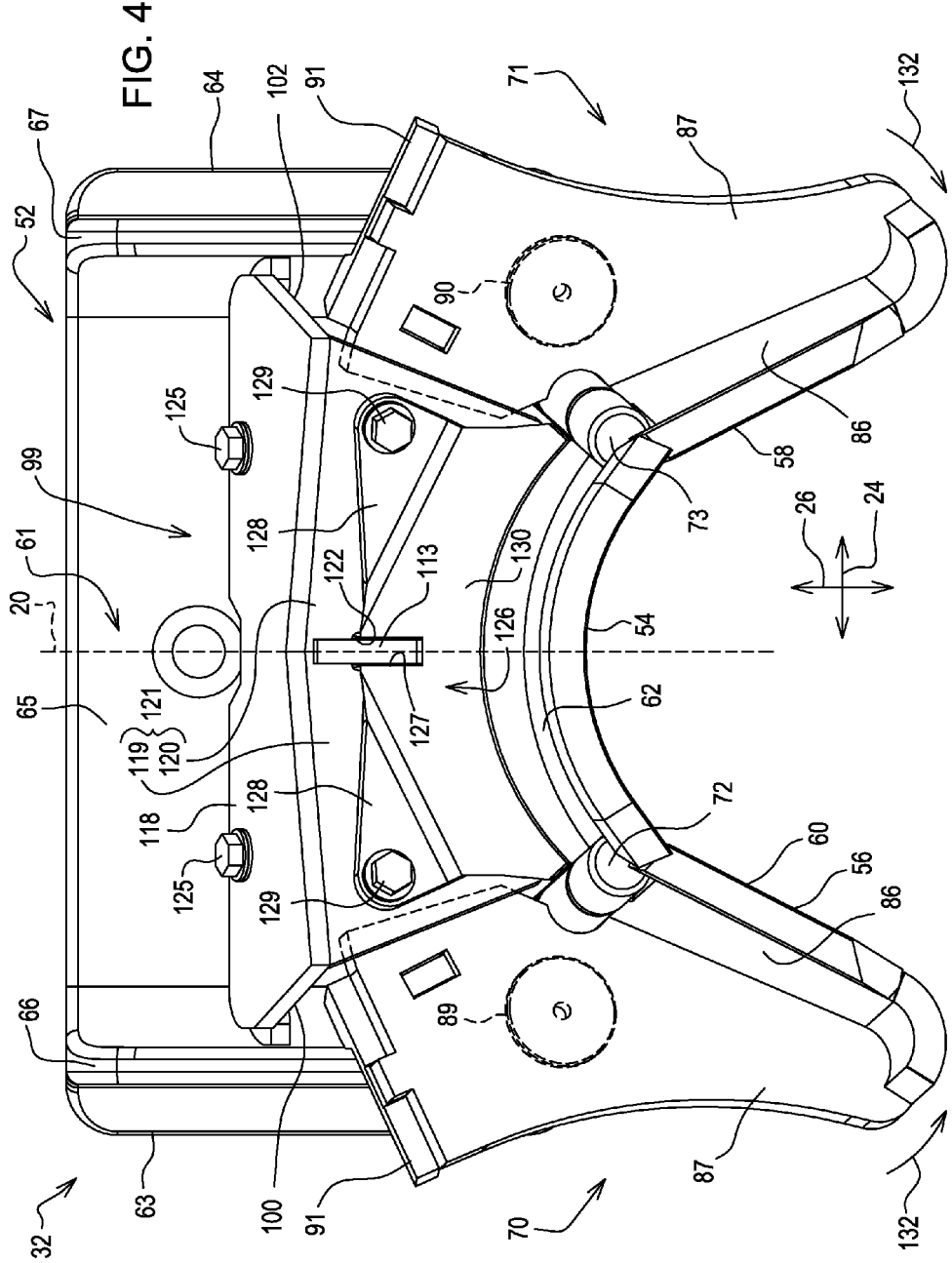
FIG. 4 is an end elevation view showing the first and second side blades of the delimb knife module in a first extreme position.
Figure 6:
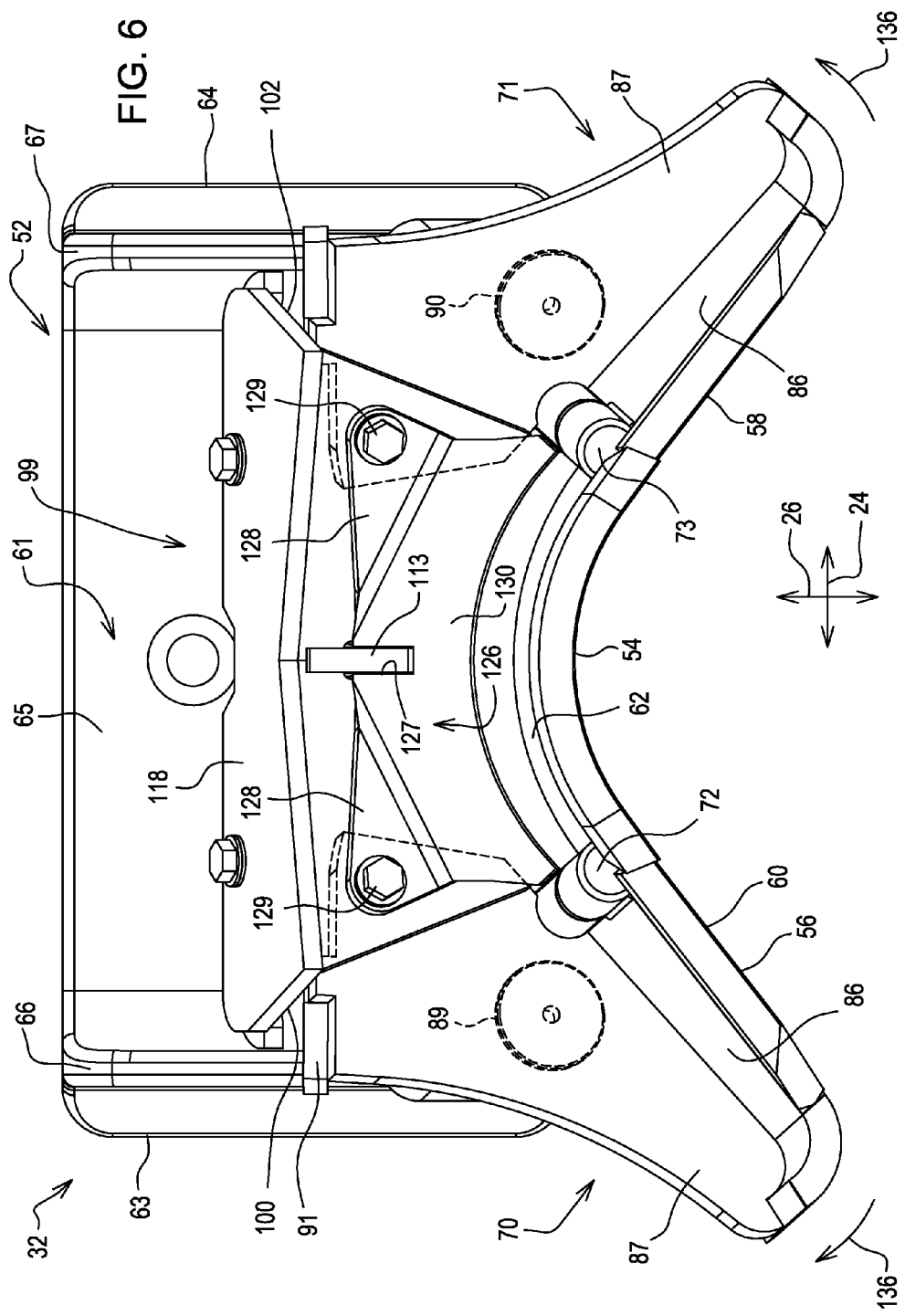
FIG. 6 is an end elevation view showing the first and second side blades of the delimb knife module in a second extreme position.

Referring to FIGS. 4 and 6, the debris shield 99 is positioned in overlapping relation with each of the first and second carriers 70, 71. Such overlap occurs at least partially throughout the pivot ranges of the first and second carriers 70, 71. The front wall 121 overlaps the second plate 87 of the first carrier 70 and the second plate 87 of the second carrier 71.

Referring to FIGS. 10 and 11, the debris shield 99 has a deflector wall 126 positioned forwardly of the front wall 121 relative to the fore-aft axis 22 to deflect debris over the debris shield 99. The deflector wall 126 is configured, for example, as a plate and has a slot 127 that opens at a peripheral edge of the deflector wall 126. During assembly, the deflector wall 126 is arranged such that the alignment key 113 is positioned in the slot 127. The second leg 115 of the key 113 is positioned in the slot 127.

Once so positioned, the wall 126 is fastened to the front wall 121 and attached (e.g., welded) to the support wall 62 and the key 113. The wall 126 has two ears 128 and two fasteners 129. Each ear 128 is fastened to the wall 126 with a respective fastener 129. The ears 128 are fastened respectively to the front plates 119, 120 with the fasteners 129. Each fastener 129 includes a bolt and a washer, the bolt extending through the washer and a hole in the respective ear 128 into a threaded hole of the respective front plate 119, 120.

The deflector wall 126 has a slanted portion 130. The slanted portion 130 is slanted relative to the support wall 62 of the platform 52 and the front wall 121 to deflect debris over the debris shield 99. The slanted portion 130 is attached (e.g., welded) to the support wall 62 and has the slot 127 which is attached (e.g., welded) to the key 113.

To accommodate such slanting of the slanted portion 130, the front plates 119, 120 are angled relative to one another, and the ears 128 are bent relative to the slanted portion 130 in order to fasten the wall 126 to the front plates 119, 120. The front wall 121 may be a one-piece construction in which case the front plates 119, 120 may be portions of the one-piece front wall 121, the one-piece construction bent in the middle to angle those portions relative to one another for fastening of the ears respectively thereto.

Figure 5:
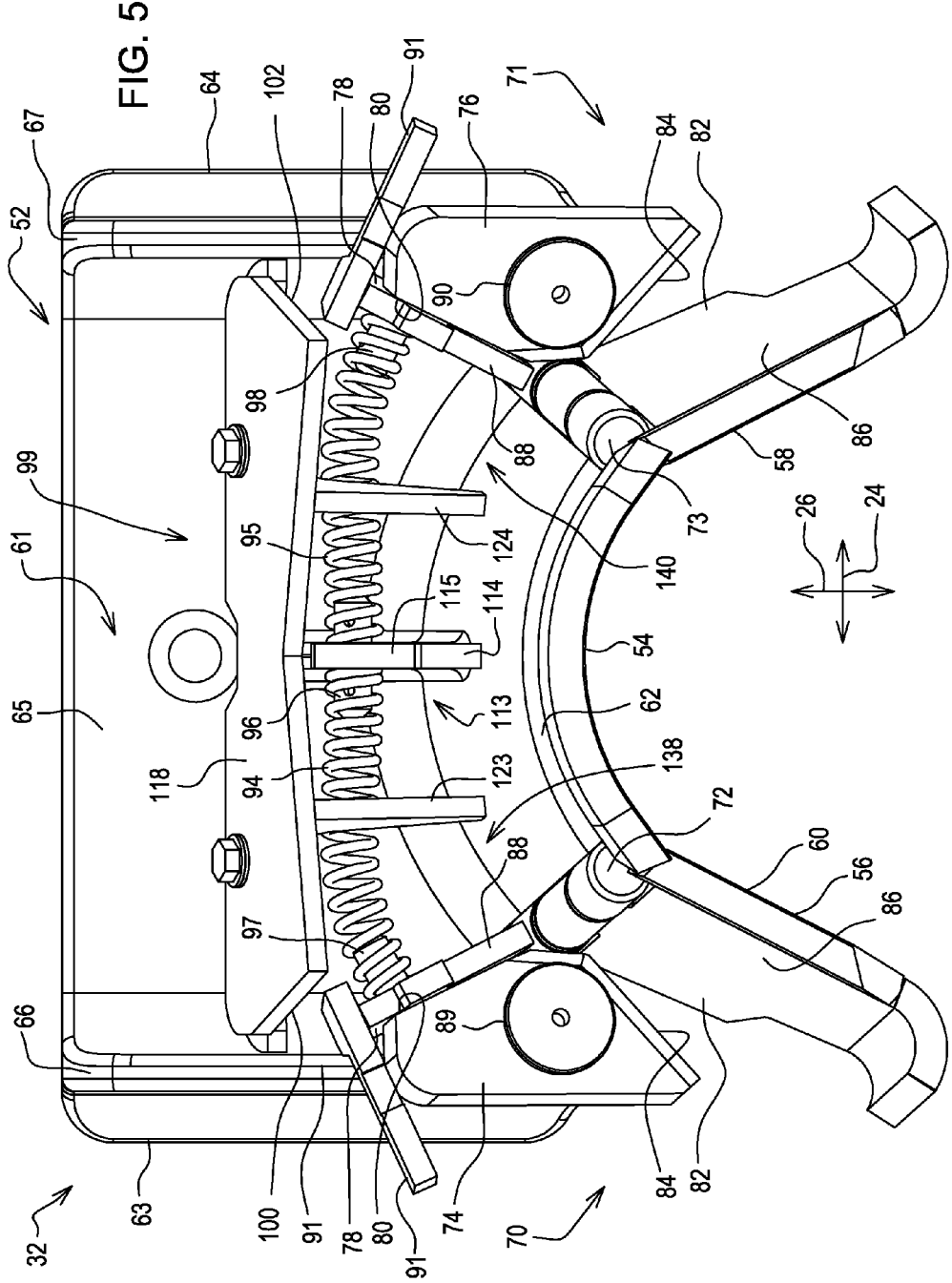
FIG. 5 is an end elevation view, with portions broken away, showing the first and second side blades of the delimb knife module in the first extreme position.

Referring to FIGS. 4 and 5, the first side blade 56 and the first carrier 70 are mounted to pivot relative to the platform in a path-narrowing direction 132 narrowing a feeding path 134 for the felled tree and a path-enlarging direction 136 enlarging the feeding path 134. Similarly, the second side blade 58 and the second carrier 71 are mounted to pivot relative to the platform in a path-narrowing direction 132 narrowing the feeding path 134 for the felled tree and a path-enlarging direction 136 enlarging the feeding path 134.

Figure 7:
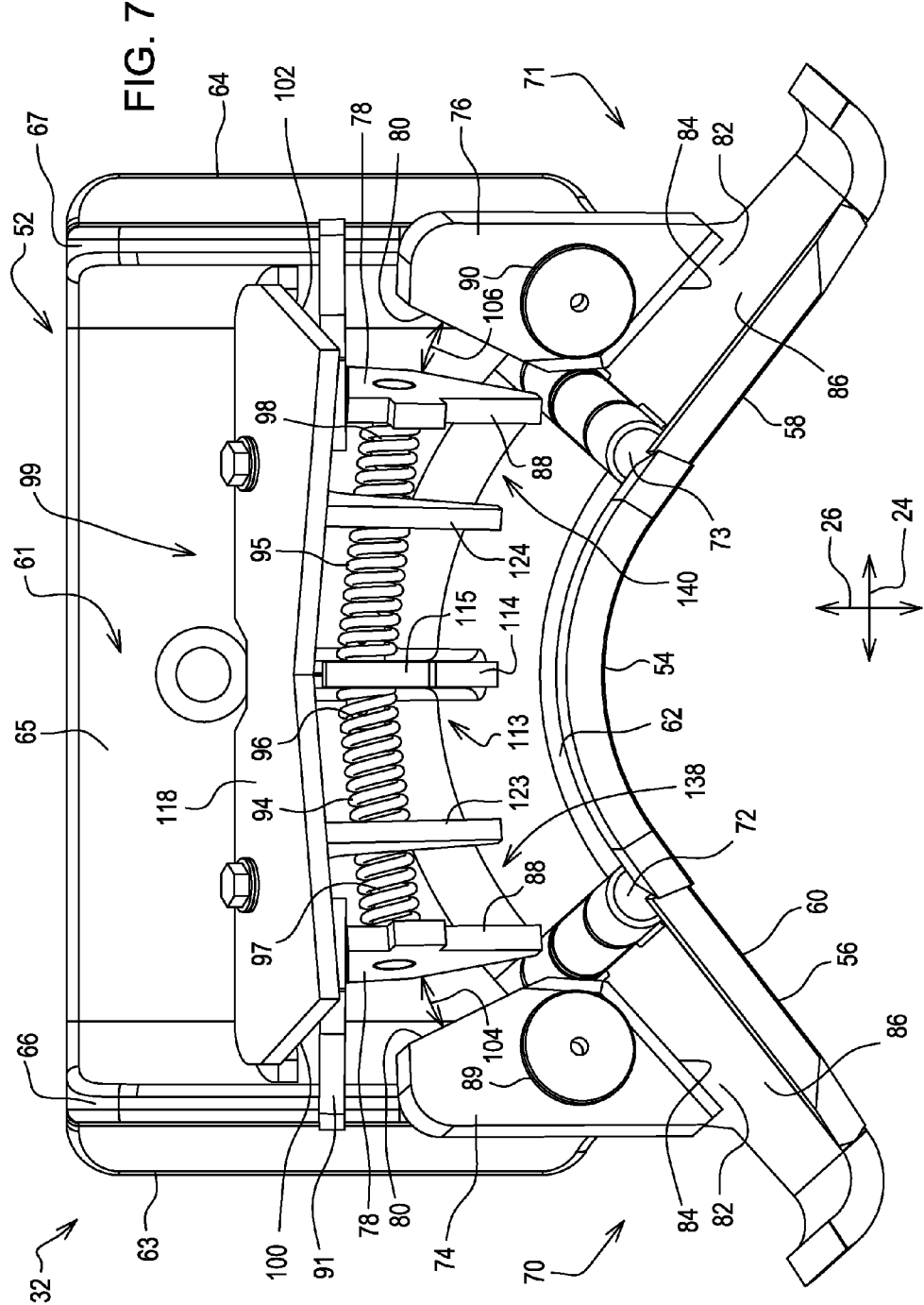
FIG. 7 is an end elevation view showing the first and second side blades of the delimb knife module in the second extreme position.

Referring to FIGS. 5 and 7, the springs 94, 95 yieldably bias respectively the first and second carriers 70, 71 and the first and second side blades 56, 58 so as to narrow the feeding path 134 for the felled tree. The first spring 94 biases yieldably the first carrier 70 and the first side blade 56 toward their first extreme position which narrows the feeding path 134 relative to their second extreme position. The second spring 95 biases yieldably the second carrier 71 and the second side blade 58 to their first extreme position which narrows the feeding path 134 relative to their second extreme position. As such, the carriers 70, 71 and the side blades 56, 58 are biased to delimb smaller diameter trees, and are pivotable to delimb larger diameter trees. The laterally outer ends of the first plates 86 of the carriers 70, 71 are curled away from the feeding path 134 to facilitate engagement with larger diameter trees (e.g., upon initial embrace of a standing tree or pick-up of a tree already felled).

The first spring 94 and the first carrier 70 cooperate to provide a first biaser 138, and the second spring 95 and the second carrier 71 cooperate to provide a second biaser 140. As such, the first biaser 138 yieldably biases the first side blade 56 and the first carrier 70 in their path-narrowing direction 132 to the first extreme position, and the second biaser 140 yieldably biases the second side blade 58 and the second carrier 71 in their path-narrowing direction 132 to the second extreme position.

The welds and threads of the timber-working head have not been shown for simplification of illustration, it being understood that it would be well within the skill of one of ordinary skill in the art to provide the welds without undue experimentation. While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A timber-working head having a fore-aft dimension and a lateral dimension perpendicular to the fore-aft dimension, the timber-working head comprising:
   a frame,
   a grapple-and-feed system mounted to the frame and configured to hold a felled tree and to feed the felled tree in the fore-aft dimension along a feeding path, the grapple-and-feed system comprising a first drive arm, a second drive arm, a first delimb arm, and a second delimb arm, the first and second drive arms attached pivotally to the frame on laterally opposite sides of a median plan of the timber-working head and configured to feed a felled tree along the feeding path, the first and second delimb arms attached pivotally to the frame on laterally opposite sides of the median plane, each delimb arm comprising a blade, and
   a delimb knife module configured to delimb the felled tree when the felled tree is fed past the delimb knife module in the fore-aft dimension by the grapple-and-feed system, the delimb knife module comprising a platform detachably mounted to the frame, a central blade, a first side blade, and a second side blade, the central blade mounted to the platform in fixed relation thereto, the first and second side blades mounted pivotally to the platform such that the first and second side blades are positioned on laterally opposite sides of the central blade relative to the lateral dimension and are configured to provide delimb coverage circumferentially between the central blade and the first and second delimb arms, respectively, relative to a felled tree held by the grapple-and-feed-system, and the central blade and the first and second side blades cooperating to provide the delimb knife module with a cutting edge that is variable in profile in response to pivotal movement of the first and second side blades relative to the platform, each of the first and second side blades biased yieldably relative to the platform in a path-narrowing direction narrowing the feeding path.

2. The timber-working head of claim 1, wherein the delimb knife module comprises a first carrier mounted pivotally to the platform and to which the first side blade is mounted and a second carrier mounted pivotally to the platform and to which the second side blade is mounted, and the first and second carriers are positioned on laterally opposite sides of the platform relative to the lateral dimension.

3. The timber-working head of claim 2, wherein the delimb knife module comprises a first stop body and a second stop body, the first and second stop bodies are mounted to the platform, the first carrier and the first side blade are pivotable relative to the platform between a first extreme position in which a first striker of the first carrier contacts a first abutment of the first stop body and a second extreme position in which a second striker of the first carrier contacts a second abutment of the first stop body, and the second carrier and the second side blade are pivotable relative to the platform between a first extreme position in which a first striker of the second carrier contacts a first abutment of the second stop body and a second extreme position in which a second striker of the second carrier contacts a second abutment of the second stop body.

4. The timber-working head of claim 3, wherein each of the first and second carriers comprises a first plate, a second plate attached on edge to the first plate, and a third plate attached on edge to the second plate, the first blade is mounted to the first plate of the first carrier, the first plate of the first carrier comprises the first striker of the first carrier, and the third plate of the first carrier comprises the second striker of the first carrier, the second blade is mounted to the first plate of the second carrier, the first plate of the second carrier comprises the first striker of the second carrier, and the third plate of the second carrier comprises the second striker of the second carrier.

5. The timber-working head of claim 4, wherein the platform comprises a tab, the delimb knife module comprises a first spring positioned between the tab and the third plate of the first carrier and a second spring positioned between the tab and the third plate of the second carrier.

6. The timber-working head of claim 5, wherein the delimb knife module comprises a debris shield mounted to the platform aft of the central blade relative to the fore-aft dimension, the debris shield covers the first spring and the second spring and comprises a first end opening and a second end opening, the first and second end openings are positioned laterally opposite to one another relative to the lateral dimension, and the first and second carriers telescope respectively through the first and second end openings throughout their pivot ranges such that the debris shield and the first and second carriers cooperate to shield the first spring, the second spring, a first gap defined between the third plate of the first carrier and the first stop body when the first carrier is positioned apart from the second extreme position of the first carrier, and a second gap defined between the third plate of the second carrier and the second stop body when the second carrier is positioned apart from the second extreme position of the second carrier against debris flowing in an aft direction relative to the fore-aft dimension.

7. The timber-working head of claim 6, wherein the debris shield comprises a mounting bracket mounted to the platform, a cover wall mounted to the mounting bracket, and a front wall mounted to the cover wall, the cover wall and the front wall cooperate to cover the first and second springs, and the front wall overlaps the second plate of the first carrier and the second plate of the second carrier.

8. The timber-working head of claim 7, wherein the debris shield comprises a deflector wall positioned forwardly of the front wall relative to the fore-aft dimension and comprising a slanted portion that is slanted relative to the platform to deflect debris over the debris shield.

9. The timber-working head of claim 8, wherein the delimb knife module comprises an alignment key mounted to the tab and positioned in a first slot of the front wall and a second slot of the deflector wall.

10. The timber-working head of claim 9, wherein the alignment key comprises a first leg and a second leg, the first and second legs partially overlap one another, the first leg is mounted to the tab and is positioned in the first slot, and the second leg is positioned in the second slot.

11. The timber-working head of claim 8, wherein the platform comprises a mounting wall mounted to the frame and a support wall mounted to the mounting wall so as to angle forwardly from the mounting wall relative to the fore-aft dimension, the mounting bracket is mounted to the mounting wall, the first and second carriers are hinged to the support wall, and the deflector wall is fastened to the front wall and attached to the support wall.

12. The timber-working head of claim 3, wherein the delimb knife module comprises a first spring and a second spring, the first spring is positioned between the platform and the first carrier so as to bias yieldably the first carrier and the first side blade toward their first extreme position which narrows the feeding path for the felled tree relative to their second extreme position, and the second spring is positioned between the platform and the second carrier so as to bias yieldably the second carrier and the second side blade toward their first extreme position which narrows the feeding path relative to their second extreme position.

13. The timber-working head of claim 12, wherein the delimb knife module comprises a debris shield covering the first and second springs.

14. The timber-working head of claim 13, wherein the debris shield is positioned in overlapping relation with each of the first and second carriers.

15. The timber-working head of claim 2, wherein each of the first and second carriers is hinged to the platform, the delimb knife module comprises a first stop body that is mounted to the platform and that the first carrier contacts when the first carrier is positioned in at least one extreme position within its pivot range relative to the platform, a second stop body that is mounted to the platform and that the second carrier contacts when the second carrier is positioned in at least one extreme position within its pivot range relative to the platform, a first thrust bearing positioned between the first carrier and the first stop body, and a second thrust bearing positioned between and in contact with the second carrier and the second stop body.

16. The timber-working head of claim 1, wherein each of the first and second side blades is mounted to pivot relative to the platform in its path-narrowing direction narrowing the feeding path for the felled tree and a path-enlarging direction enlarging the feeding path, the delimb knife module comprises a first biaser and a second biaser, the first biaser yieldably biases the first side blade in its path-narrowing direction, the second biaser yieldably biases the second side blade in its path-narrowing direction, the first biaser comprises a spring, and the second biaser comprises a spring.

17. The timber-working head of claim 16, wherein the delimb knife module comprises a debris shield covering the first and second springs.

18. The timber-working head of claim 1, wherein the first and second side blades are mounted to pivot relative to the platform independently of one another.

19. The timber-working head of claim 1, each of the first and second side blades is mounted to pivot relative to the platform independently of each delimb arm.

20. A timber-working head having a fore-aft dimension and a lateral dimension perpendicular to the fore-aft dimension, the timber-working head comprising:
   a frame,
   a grapple-and-feed system mounted to the frame and configured to hold a felled tree and to feed the felled tree in the fore-aft dimension, and
   a delimb knife configured to delimb the felled tree when the felled tree is fed past the delimb knife in the fore-aft dimension by the grapple-and-feed system, the delimb knife mounted to the frame via a platform detachably mounted to the frame, the delimb knife comprising a central blade mounted to the platform in fixed relation thereto, a first side blade, and a second side blade, the first and second side blades positioned on laterally opposite sides of the central blade relative to the lateral dimension and mounted pivotally to the platform such that the central blade and the first and second side blades cooperate to provide the delimb knife with a cutting edge that is variable in profile in response to pivotal movement of the first and second side blades relative to the central blade, the delimb knife comprising a pivotally mounted first carrier to which the first side blade is mounted, a pivotally mounted second carrier to which the second side blade is mounted, a compression first spring biasing yieldably the first carrier and the first side blade therewith, a compression second spring biasing yieldably the second carrier and the second side blade therewith, and a debris shield covering the first and second springs and positioned in overlapping relation with each of the first and second carriers in front of the first and second springs relative to the fore-aft dimension.

* * * * *